(12) United States Patent
Rajauria et al.

(10) Patent No.: US 10,056,098 B1
(45) Date of Patent: Aug. 21, 2018

(54) DATA STORAGE DEVICE EMPLOYING MULTI-MODE SENSING CIRCUITRY FOR MULTIPLE HEAD SENSOR ELEMENTS

(71) Applicant: Western Digital Technologies, Inc., San Jose, CA (US)

(72) Inventors: Sukumar Rajauria, San Jose, CA (US); Erhard Schreck, San Jose, CA (US); John T. Contreras, Palo Alto, CA (US); Joey M. Poss, Rochester, MN (US); Rehan A. Zakai, San Ramon, CA (US); Robert Smith, San Jose, CA (US); Barry C. Stipe, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/825,342

(22) Filed: Nov. 29, 2017

(51) Int. Cl.
*G11B 5/09* (2006.01)
*G11B 5/012* (2006.01)
*G11B 5/00* (2006.01)

(52) U.S. Cl.
CPC ...... *G11B 5/012* (2013.01); *G11B 2005/0008* (2013.01); *G11B 2220/2508* (2013.01)

(58) Field of Classification Search
None
See application file for complete search history.

(56) References Cited

U.S. PATENT DOCUMENTS

| | | | |
|---|---|---|---|
| 3,860,965 A | 1/1975 | Voegeli | |
| 4,691,259 A * | 9/1987 | Imakoshi | G11B 5/03 360/66 |
| 4,987,509 A * | 1/1991 | Gill | G11B 5/1278 360/315 |
| 5,953,173 A * | 9/1999 | Klaassen | G11B 5/02 360/66 |
| 8,730,607 B1 | 5/2014 | Garzon et al. | |
| 8,736,996 B2 | 5/2014 | Che et al. | |
| 8,804,272 B1 * | 8/2014 | Dakroub | G11B 5/6005 360/46 |
| 8,842,383 B1 | 9/2014 | Balamane et al. | |
| 8,908,483 B1 | 12/2014 | Ren et al. | |

(Continued)

OTHER PUBLICATIONS

Haoyu Wu, David Bogy, "Use of an embedded contact sensor to study nanoscale heat transfer in heat assisted magnetic recording" Applied Physics Letters, 110, 033104, Jan. 2017, American Institute of Physics.

*Primary Examiner* — Peter Vincent Agustin

(57) ABSTRACT

A data storage device is disclosed comprising a head actuated over a disk, wherein the head comprises a first sensor element and a second sensor element. When configured into a first single-ended mode, a bias signal is applied to the first sensor element to generate a first single-ended output signal based on a response of the first sensor element, and when configured into a second single-ended mode, the bias signal is applied to the second sensor element to generate a second single-ended output signal based on a response of the first sensor element. When configured into a differential mode, the bias signal is concurrently applied to the first sensor element and the second sensor element to generate a differential output signal based on a response of the first sensor element and the second sensor element.

20 Claims, 8 Drawing Sheets

(56) References Cited

U.S. PATENT DOCUMENTS

| | | | |
|---|---|---|---|
| 8,922,935 B1 * | 12/2014 | Ionescu | G11B 5/02 360/67 |
| 8,976,480 B1 | 3/2015 | Canchi et al. | |
| 8,976,481 B1 | 3/2015 | Zeng et al. | |
| 9,047,926 B2 | 6/2015 | Contreras et al. | |
| 9,601,140 B1 | 3/2017 | Rajauria | |
| 2005/0174669 A1 * | 8/2005 | Contreras | G11B 5/012 360/46 |
| 2015/0003222 A1 * | 1/2015 | Dakroub | G11B 5/6005 369/13.33 |

* cited by examiner

DATA STORAGE DEVICE EMPLOYING MULTI-MODE SENSING CIRCUITRY FOR MULTIPLE HEAD SENSOR ELEMENTS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Data is typically written to the disk by modulating a write current in an inductive coil to record magnetic transitions onto the disk surface in a process referred to as saturation recording. During read-back, the magnetic transitions are sensed by a read element (e.g., a magneto-resistive element) and the resulting read signal demodulated by a suitable read channel. Heat assisted magnetic recording (HAMR) and microwave assisted magnetic recording (MAMR) are recent developments that improve the quality of written data by heating the disk surface during write operations in order to decrease the coercivity of the magnetic medium, thereby enabling the magnetic field generated by the write coil to more readily magnetize the disk surface.

An air bearing forms between the head and the disk due to the disk rotating at high speeds. Since the quality of the write/read signal depends on the fly height of the head, conventional heads (e.g., magneto-resistive heads) may comprise an actuator for controlling the fly height. Any suitable dynamic fly height (DFH) actuator may be employed, such as a heater which controls fly height through thermal expansion, or a piezoelectric (PZT) actuator. The fly height may also be affected by other expansive components of the head, such as when a near field transducer (NFT) protrudes toward the disk while heating the disk with a laser (HAMR). Accordingly, it is desirable to determine the appropriate DFH setting (e.g., appropriate current applied to a heater) that achieves the target fly height for the head during write and read operations. To this end, a touchdown sensor may be integrated into the head for determining the DFH setting that causes a component of the head (e.g., the NFT) to contact the disk surface.

FIG. 1A shows a prior art disk drive comprising a head 2 having an integrated touchdown sensor 4, and control circuitry 6 comprising a differential amplifier 8 configured to sense a voltage change across the touchdown sensor 4. The touchdown sensor 4 is coupled to the control circuitry 6 over two lead lines each connected to a respective end of the touchdown sensor 4. A control voltage 10 is applied to one end of the touchdown sensor 4 in order to bias the sensor so that it operates in a linear range. The touchdown sensor 4 may be a thermistor having a resistance that varies with a decreasing fly height and/or as the head contacts the disk surface. The resulting change in resistance is transduced into a single-ended output 12 voltage output by the differential amplifier 8.

FIG. 1B shows prior art control circuitry 6 for generating the single-ended output 12 representing the response of the touchdown sensor 4. The control circuitry 6 comprises a common-gate differential amplifier with a bias voltage 14 in series with the common-gates which generates a corresponding bias voltage across the touchdown sensor 4. A current source $16_1$ and $16_2$ biases each leg of the common-gate differential amplifier to cancel the effect of the bias current from the bias voltage 14, thereby achieving a zero-reference point for the single-ended differential output 12 (i.e., a quiescent state). A control voltage 18 biases the gates of the transistors $20_1$ and $20_2$ to set the voltage of Rsense 14 with respect to the ground potential. The control voltage 18 is coupled to the plus terminal side (+) of the differential amplifier, but in other embodiments it can be coupled to the negative terminal side (−), or as a common-mode voltage of the amplifier's input.

The small signal response of the control circuitry 6 shown in FIG. 1B can be described as:

$$V_{out} = V_{in} * G1$$
$$Vin = \frac{\Delta Rsense * Ibias * 2 * RL * gm}{2 + gm * Rsense}$$

where gm is the conductance of the transistors.

DETAILED DESCRIPTION

Figure 2A:
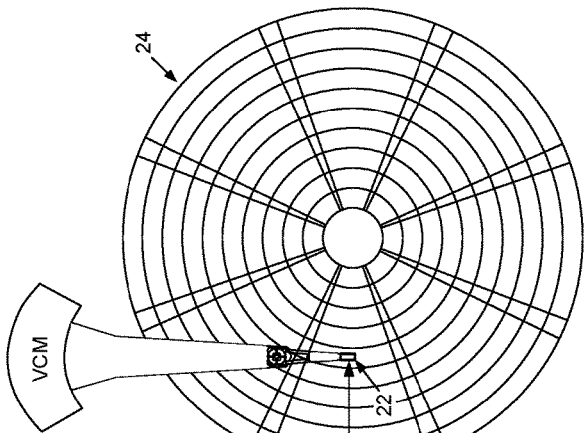
FIGS. 2A and 2B show a data storage device in the form of a disk drive according to an embodiment comprising head actuated over a disk, wherein the head comprises at least two sensor elements.
Figure 2B:
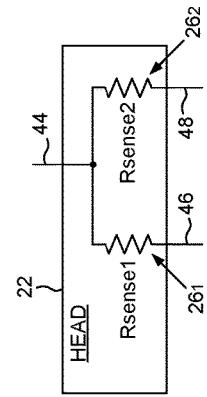
Figure 2C:
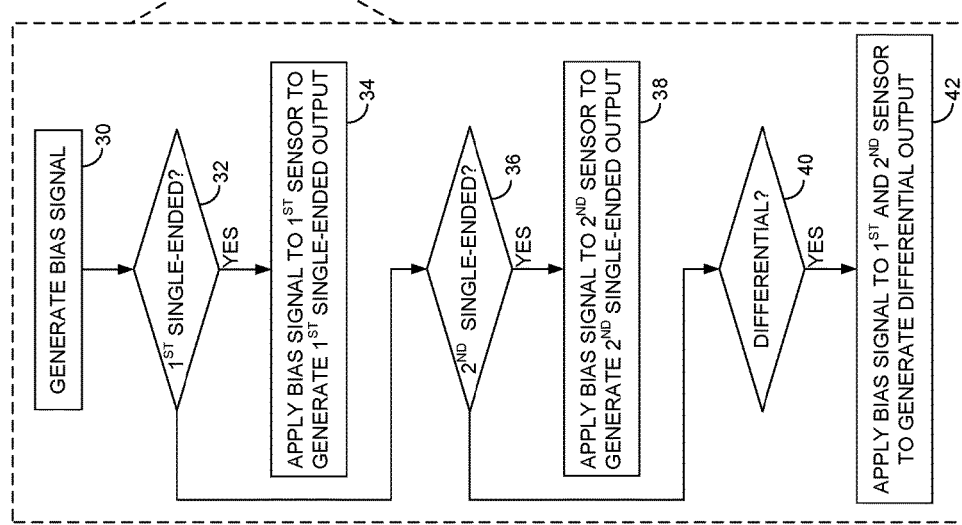
FIG. 2C is a flow diagram according to an embodiment wherein the control circuitry may apply a bias signal to one or both of the sensor elements to generate a single-ended or differential output.

FIG. 2A shows a data storage device in the form of a disk drive according to an embodiment comprising a head 22 actuated over a disk 24, wherein the head 22 comprises a first sensor element $26_1$ and a second sensor element $26_2$ (FIG. 2B). The disk drive further comprises control circuitry 28 configured to execute the flow diagram of FIG. 2C, wherein a bias signal is generated (block 30) and when configured into a first single-ended mode (block 32), the bias signal is applied to the first sensor element to generate a first single-ended output signal based on a response of the first sensor element (block 34). When configured into a second single-ended mode (block 36), the bias signal is applied to the second sensor element to generate a second single-ended output signal based on a response of the second sensor element (block 38). When configured into a differential mode (block 40), the bias signal is concurrently applied to the first sensor element and the second sensor element to generate a differential output signal based on a response of the first sensor element and the second sensor element (block 42).

Figure 1A:
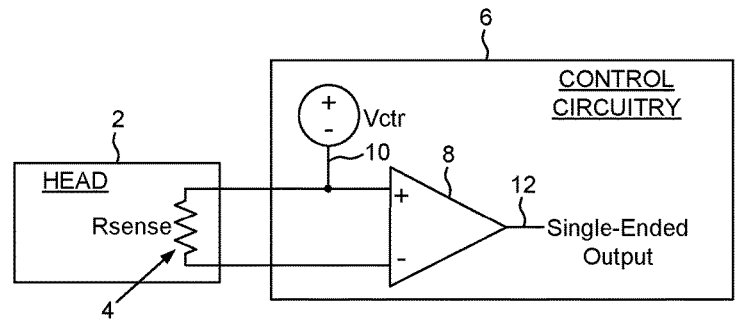
FIG. 1A shows a prior art configuration of a head comprising a touchdown sensor and control circuitry for generating a single-ended output representing the response of the touchdown sensor.
Figure 1B:
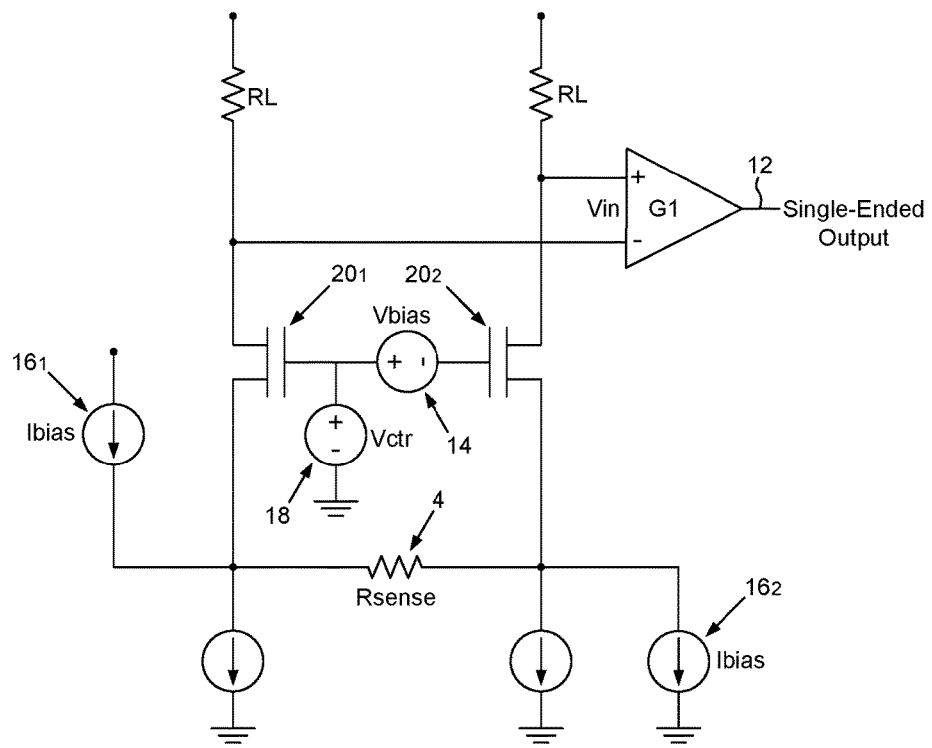
FIG. 1B shows prior art control circuitry comprising a common-gate differential amplifier for generating the single-ended output representing the response of the touchdown sensor.

In the embodiment of FIG. 2B, a first lead 44 connects a first end of the first sensor element $26_1$ to the control circuitry 28, and connects a first end of the second sensor element $26_2$ to the control circuitry 28. A second lead 46 connects a second end of the first sensor element $26_1$ to the control circuitry 28, and a third lead 48 connects a second end of the second sensor element $26_2$ to the control circuitry 28. Accordingly this embodiment employs three leads to bias one or both of the sensor elements, as well as detect the response of the sensor elements. Employing three leads from the control circuitry 28 to the head 22 reduces the cost as compared to employing four leads (two leads for each sensor element with separate sensing circuitry such as shown in FIG. 1B).

Any suitable sensor elements may be employed in FIG. 2B, such as a touchdown sensor or a temperature sensor configured to measure a temperature of a near field transducer in HAMR or a temperature of a spin torque oscillator (STO) in MAMR. In one embodiment, one or both sensor elements may comprise a thermistor having a resistance that varies with temperature. Accordingly, in one embodiment a bias signal (e.g., bias voltage or bias current) may be applied to the sensor element and the change in resistance may be measured in response to a change in temperature. The change in resistance may be measured, for example, by applying a bias current to the sensor element and measuring a change in voltage across the sensor element due to the change in resistance.

Figure 3:
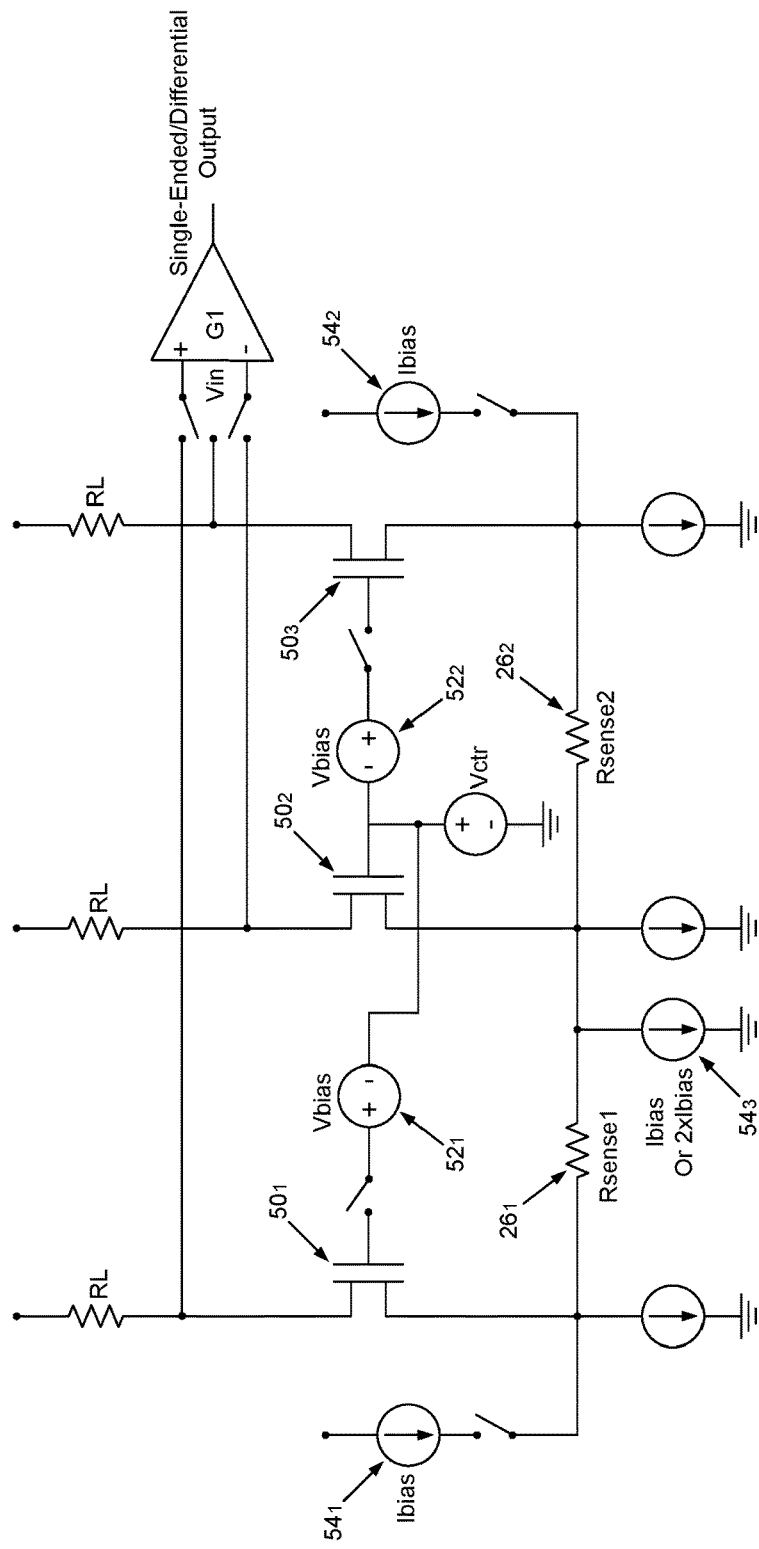
FIG. 3 shows control circuitry according to an embodiment comprising shared transistors for implementing amplifiers configured to generate a single-ended output for each sensor element, or a differential output based on a difference in voltage across each sensor element.

FIG. 3 shows control circuitry according to an embodiment comprising shared transistors for implementing amplifiers configured to generate a single-ended output for each sensor element, or a differential output based on a difference in voltage across each sensor element. In the embodiment of FIG. 3, two of three transistors $50_1$-$50_3$ may be configured into a common-gate differential amplifier depending on the mode of operation (single-ended mode or differential mode). Respective bias voltages $52_1$ and $52_2$ apply a corresponding bias voltage across the respective sensor elements $26_1$ and $26_2$, and respective current sources $54_1$-$54_3$ are calibrated to apply a current to each sensor element in order to cancel the effect of the bias current from the bias voltage 52, thereby achieving a zero-reference point for the single-ended or differential output (i.e., a quiescent state). Any suitable technique may be employed to calibrate the current sources $54_1$-$54_3$ to achieve the quiescent state, such as by adjusting the input of a digital-to-analog converter (DAC) that controls the current sources $54_1$-$54_3$ until a sensed output of the common-gate differential amplifier is substantially zero. Other embodiments may employ analog techniques for sensing the output of the common-gate differential amplifier and adjusting the current sources $54_1$-$54_3$ until the output is substantially zero.

Figure 4:
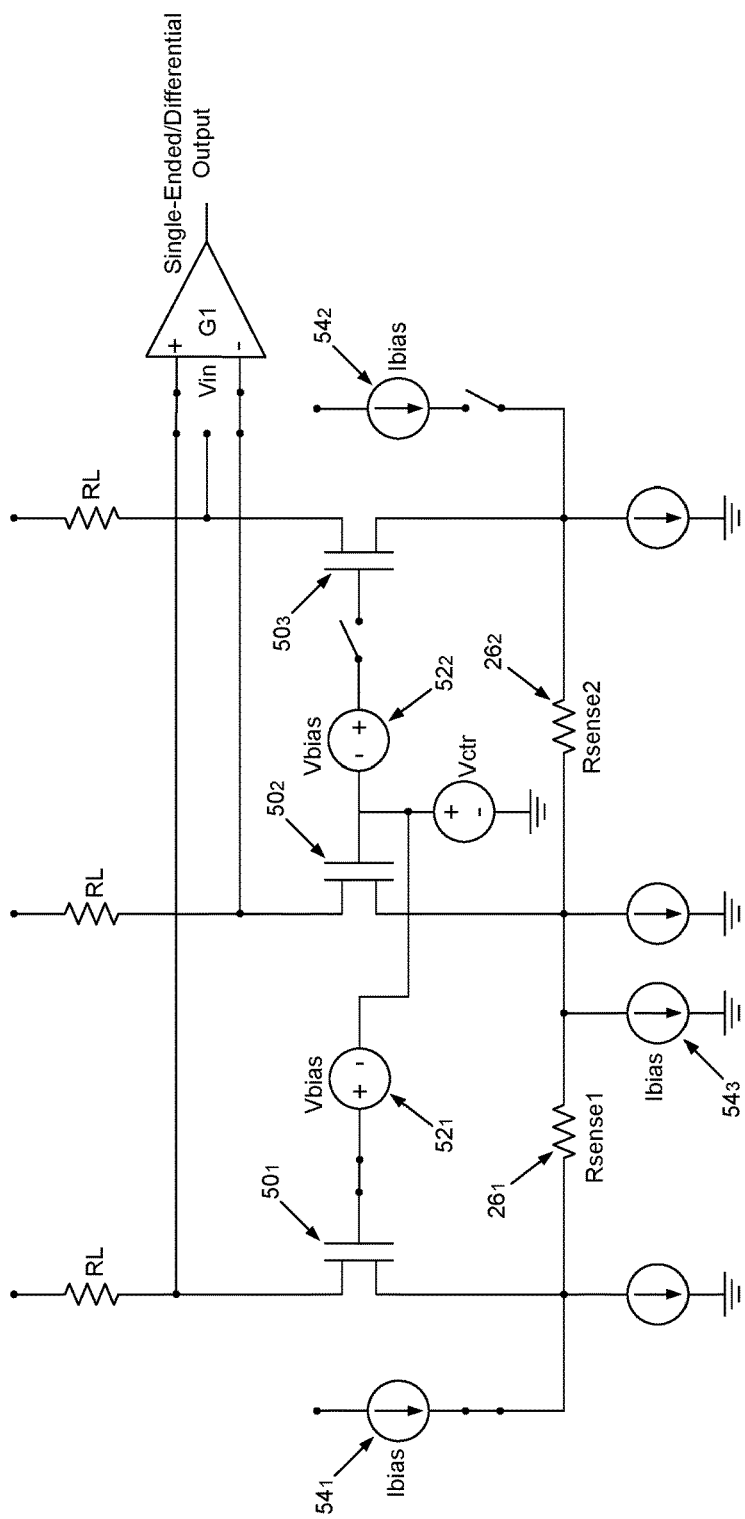
FIG. 4 shows the control circuitry configured into a first single-ended mode in order to sense a response of the first sensor element according to an embodiment.
Figure 5:
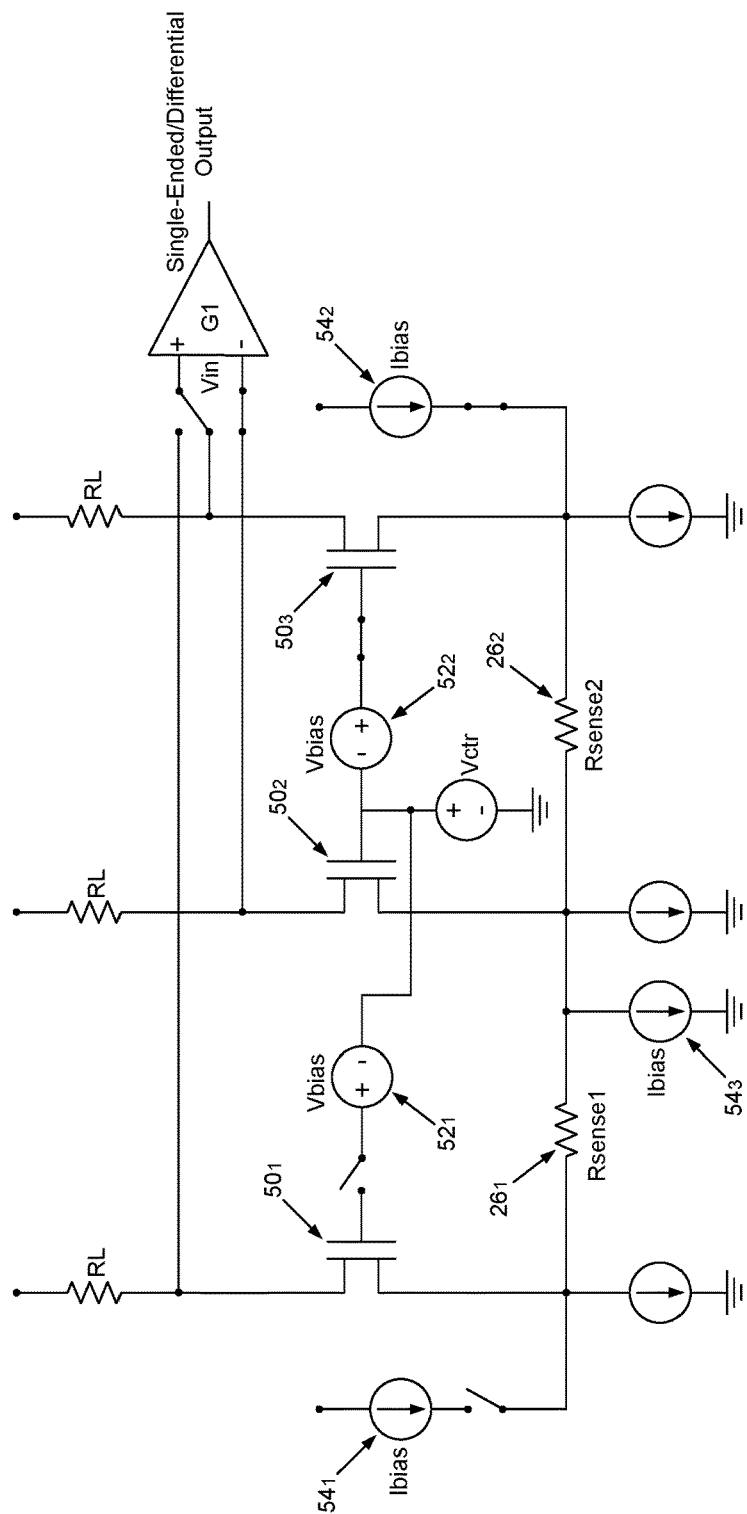
FIG. 5 shows the control circuitry configured into a second single-ended mode in order to sense a response of the second sensor element according to an embodiment.

FIG. 4 shows the control circuitry of FIG. 3 when configured into the first single-ended mode in order to detect the response of the first sensor element $26_1$. In this embodiment, transistors $50_1$ and $50_2$ are used to implement a common-gate differential amplifier. FIG. 5 shows the control circuitry of FIG. 3 when configured into the second single-ended mode in order to detect the response of the second sensor element $26_2$. In this embodiment, transistors $50_2$ and $50_3$ are used to implement a common-gate differential amplifier.

Figure 6:
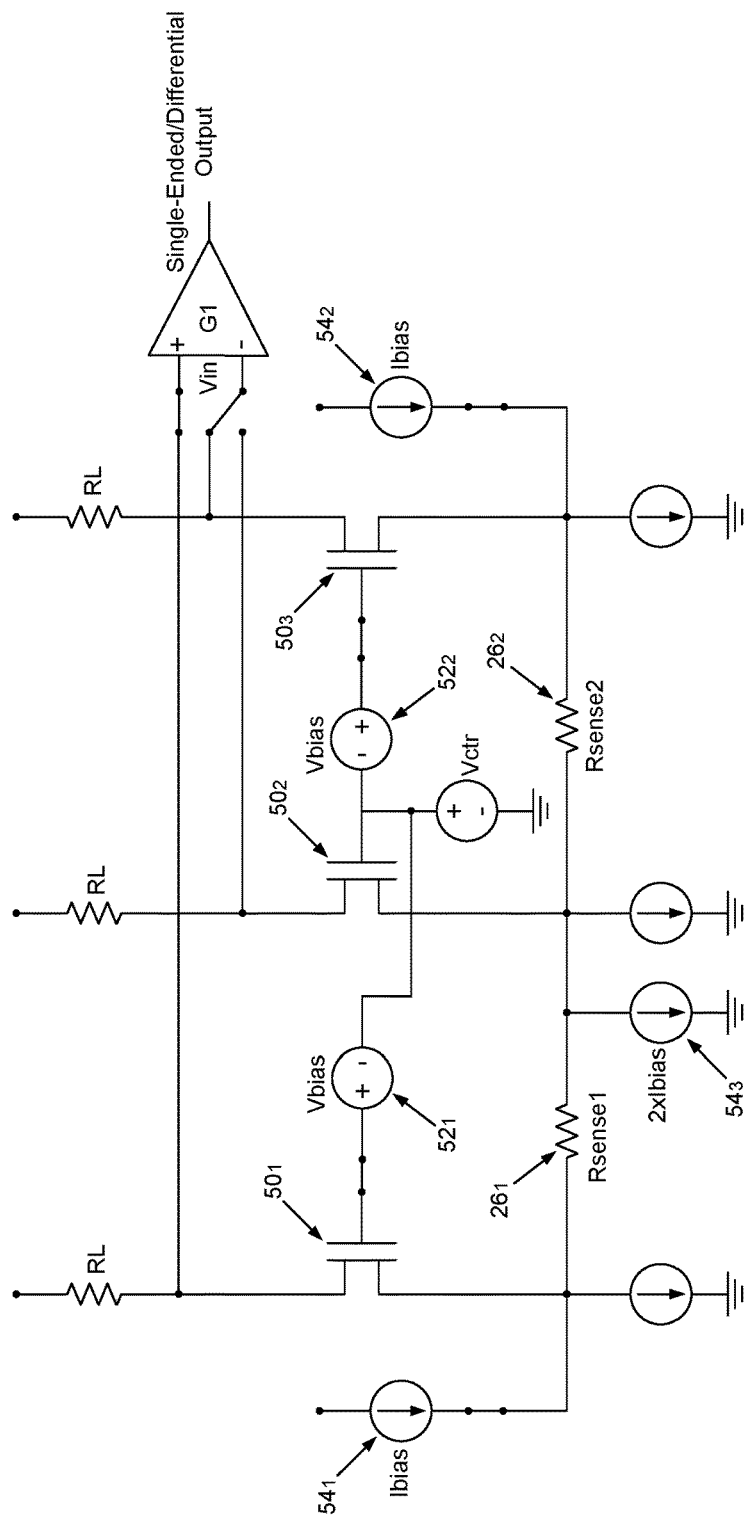
FIG. 6 shows the control circuitry configured into a differential mode in order to sense a differential response of the first and second sensor elements according to an embodiment.

FIG. 6 shows the control circuitry of FIG. 3 when configured into the differential mode in order to detect the differential response of first and second sensor elements $26_1$ and $26_2$. In this embodiment, transistors $50_1$ and $50_3$ are used to implement a common-gate differential amplifier. Note the opposite polarity of the bias voltages $52_1$ and $52_2$ which applies opposite polarity bias voltages across the first and second sensor elements $26_1$ and $26_2$ so that the common-gate differential amplifier senses the difference between the voltages induced across the sensor elements $26_1$ and $26_2$ due, for example, to the changing resistance of a thermistor. In the differential mode, the current sources $54_1$-$54_3$ are configured so that the voltage across each sensor element is equal, thereby achieving the zero reference point (quiescent state) for the output voltage. The small signal response of the control circuitry of FIG. 6 can be described as:

$$V_{out} = V_{in} * G1$$

$$Vin = \frac{Ibias * RL * gm(\Delta Rsense1 - \Delta Rsense2)}{1 + gm * Rsense}$$

Where Rsense≈Rsense1≈Rsense2 and gm is the transistor conductance. Assuming the temperature coefficients for both sensor elements are substantially equivalent, then using multiplier k to represent a temperature dependent small signal gain of the common-gate differential amplifier:

$$Vin = \frac{Ibias * RL * gm * k(\Delta Rsense1 - \Delta Rsense2)}{1 + gm * k * Rsense}$$

If the gain k changes from 1 to 1.3 due to a change in temperature, Vin increases by only 6% if Rsense=

$$3 * \left(\frac{1}{gm}\right).$$

Accordingly when in the differential mode, the small signal response is substantially unaffected by changes in temperature.

In one embodiment, employing the differential mode to detect the response of one of the sensor elements $26_1$ and $26_2$ provides certain advantages over the single-ended mode. For example if the ambient temperature of the disk drive changes during normal operations, the resulting effect on the sensor elements $26_1$ and $26_2$ is canceled since the change in ambient temperature will affect the DC response of both sensor elements by substantially the same amount (due to the substantially equivalent temperature coefficients) without substantially affecting the small signal differential response of the control circuitry as described above. Additionally, the differential mode may improve the sensitivity of the control circuitry since the differential response of the sensor elements cancels the DC response of the sensor elements. That is, the DC response is subtracted out leaving only the difference between the sensor element responses as the input to the common-gate differential amplifier. In one embodiment when configured into the differential mode, one of the sensor elements acts as a reference element in order to detect the response of the other sensor element. For example, in an embodiment wherein the first sensor element is a touchdown sensor, this sensor element may be considered the reference element that is not used, for example, during a write operation (e.g., when the second sensor element may be used to measure the temperature of a NFT or STO).

Figure 7:
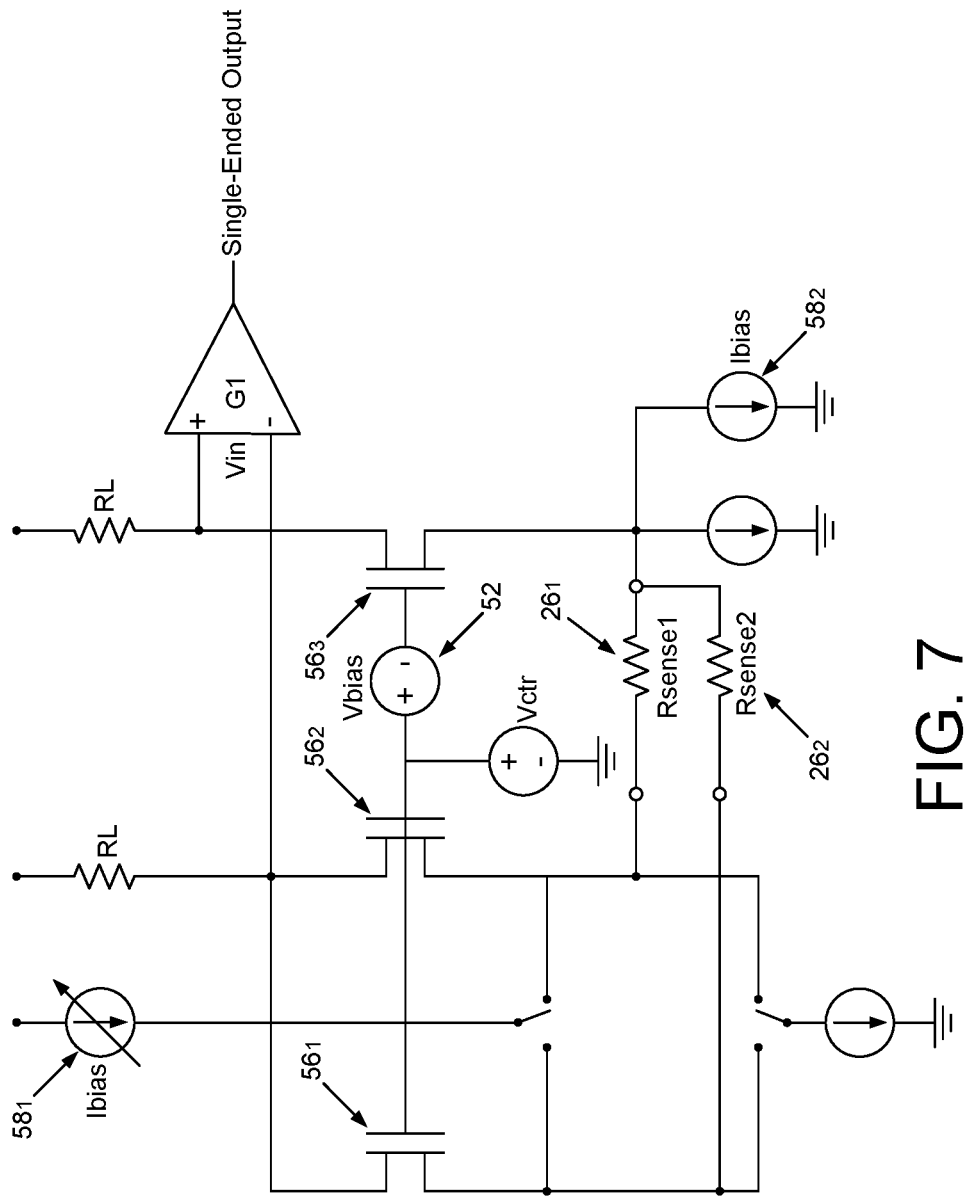
FIG. 7 shows control circuitry according to an alternative embodiment comprising shared transistors for implementing amplifiers configured to generate a single-ended output for each sensor element.

FIG. 7 shows control circuitry according to an alternative embodiment comprising shared transistors $56_1$, $56_2$ and $56_3$ for implementing amplifiers configured to generate a single-ended output for each sensor element $26_1$ and $26_2$. When sensing the response of the first sensor element $26_1$, the switches are configured to enable transistor $56_2$ to form a common-gate differential amplifier together with transistor $56_3$. When sensing the response of the second sensor element $26_2$, the switches are configured to enable transistor $56_1$ to form a common-gate differential amplifier together with transistor $56_3$. In this embodiment, the current sources $58_1$ and $58_2$ may be configured to generate different amplitude currents depending on which sensor element is enabled. That is, the calibrated current needed to establish the quiescent state (zero reference point) may be different depending upon which sensor element is being biased by the bias voltage 52.

Figure 8:
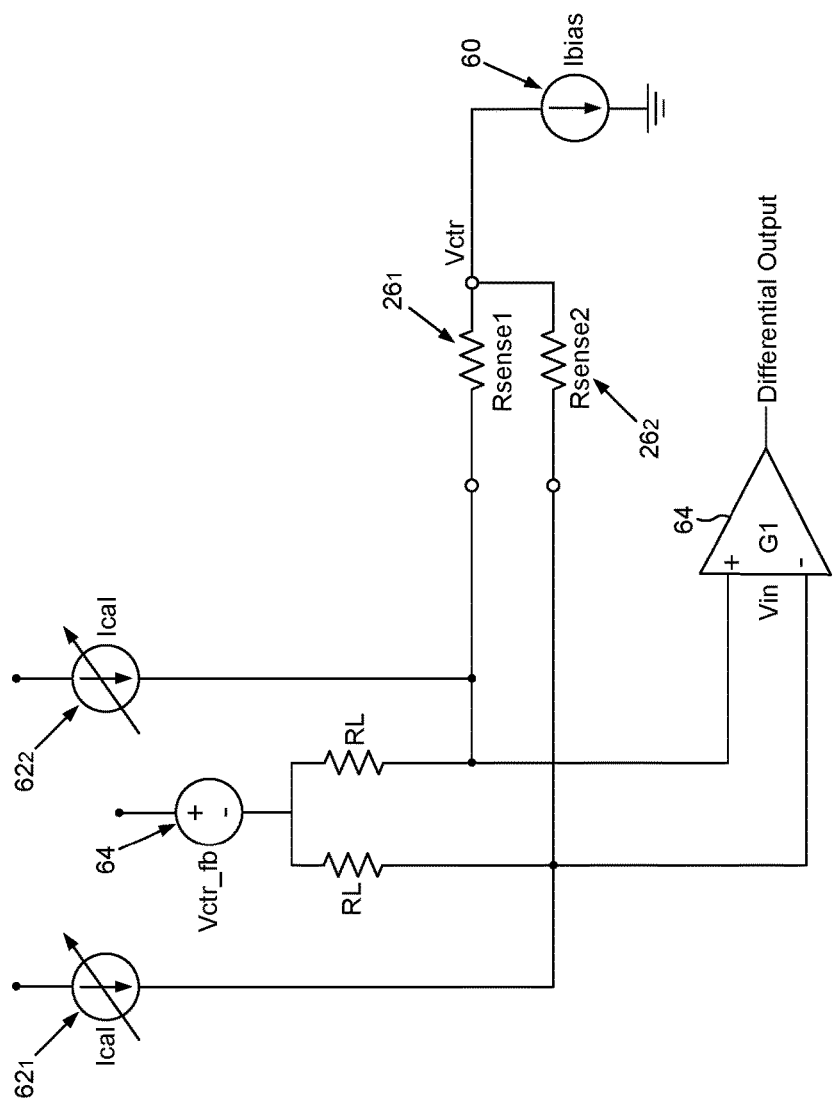
FIG. 8 shows control circuitry according to an alternative embodiment comprising a bridge circuit configured to apply a bias signal concurrently to the first and second sensor elements when in the differential mode.

FIG. 8 shows control circuitry according to an alternative embodiment comprising a bridge circuit configured to apply a bias signal concurrently to the first and second sensor elements $26_1$ and $26_2$ when in the differential mode. In one embodiment, the control circuitry of FIG. 7 is combined with the control circuitry of FIG. 8 into a single integrated circuit (e.g., a preamp circuit) which can be configured into the single-ended mode (FIG. 7) or the differential mode (FIG. 8). In FIG. 8, current source 60 generates the bias signal in the form of a bias current that is concurrently applied to both sensor elements $26_1$ and $26_2$ through the bridge circuit. Current sources $62_2$ and $62_2$ are calibrated to establish the quiescent state (zero reference point) for the differential output, and voltage source Vctr_fb 64 is configured to achieve the desired DC voltage level for Vctr. A relatively slow feedback control loop (not shown) can be used to sense Vctr and adjust Vctr_fb for the correct operating point of Vctr. For example, after configuring the current source 60 and voltage source Vctr_fb 64 (e.g., to reach the desired linear response range of the sensor elements), the current sources $62_2$ and $62_2$ may be adjusted until the differential output is zero (while the sensor elements $26_1$ and $26_2$ are in their quiescent state). The small signal response for the control circuitry of FIG. 8 may be described as:

$$Req = \frac{(RL+R1)*(RL+R2)}{(2RL+R1+R2)}$$

$$Vin = Ibias * Req * \left(\frac{R1+\Delta R1}{RL+R1+\Delta R1} - \frac{R2+\Delta R2}{RL+R2+\Delta R2}\right)$$

where R1=Rsense1 and R2=Rsense2.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, hybrid drives (disk plus solid state), etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head actuated over the disk, wherein the head comprises a first sensor element and a second sensor element; and
   control circuitry configured to:
      generate a bias signal;
      when configured into a first single-ended mode, apply the bias signal to the first sensor element to generate a first single-ended output signal based on a response of the first sensor element;
      when configured into a second single-ended mode, apply the bias signal to the second sensor element to generate a second single-ended output signal based on a response of the first sensor element; and
      when configured into a differential mode, concurrently apply the bias signal to the first sensor element and the second sensor element to generate a differential output signal based on a response of the first sensor element and the second sensor element;
   wherein the control circuitry comprises:
      a first plurality of transistors configured into a first amplifier coupled to the first sensor element, wherein the first amplifier is configured to generate the first single-ended output when in the first single-ended mode; and
      a second plurality of transistors configured into a second amplifier coupled to the second sensor element, wherein the second amplifier is configured to generate the second single-ended output when in the second single-ended mode;
      wherein the second plurality of transistors comprises at least one transistor from the first plurality of transistors.

2. The data storage device as recited in claim 1, wherein the control circuitry comprises:
   a first lead connected to a first end of the first sensor element and connected to a first end of the second sensor element;
   a second lead connected to a second end of the first sensor element; and
   a third lead connected to a second end of the second sensor element.

3. The data storage device as recited in claim 2, wherein the control circuitry is further configured to concurrently apply the bias signal to the first and second sensor elements over the first lead.

4. The data storage device as recited in claim 1, wherein at least one transistor from the first plurality of transistors and at least one transistor from the second plurality of transistors are configured into a third amplifier coupled to the first and second sensor elements, wherein the third amplifier is configured to generate the differential output when in the differential mode.

5. The data storage device as recited in claim 1, wherein the control circuitry further comprises a bridge circuit configured to apply the bias signal concurrently to the first and second sensor elements when in the differential mode.

6. The data storage device as recited in claim 1, wherein the bias signal is a voltage.

7. The data storage device as recited in claim 1, wherein the bias signal is a current.

8. A method of operating a data storage device, the method comprising:
   generating a bias signal;
   when configured into a first single-ended mode, applying the bias signal to a first sensor element of a head to generate a first single-ended output signal based on a response of the first sensor element;
   when configured into a second single-ended mode, applying the bias signal to a second sensor element of the head to generate a second single-ended output signal based on a response of the first sensor element;
   when configured into a differential mode, concurrently applying the bias signal to the first sensor element and the second sensor element to generate a differential output signal based on a response of the first sensor element and the second sensor element; and
   configuring a plurality of transistors into one of the first single-ended mode and the second single-ended mode.

9. The method as recited in claim 8, wherein concurrently applying the bias signal to the first and second sensor elements comprises concurrently applying the bias signal to the first and second sensor elements over a first lead connecting the first and second sensor elements to control circuitry.

10. The method as recited in claim 8, further comprising configuring the plurality of transistors into the differential mode.

11. The method as recited in claim 8, further comprising configuring a bridge circuit to apply the bias signal concurrently to the first and second sensor elements when in the differential mode.

12. The method as recited in claim 8, wherein the bias signal is a voltage.

13. The method as recited in claim 8, wherein the bias signal is a current.

14. A device comprising:
   control circuitry configured to:
      generate a bias signal;
      when configured into a first single-ended mode, apply the bias signal to a first sensor element of a recording head to generate a first single-ended output signal based on a response of the first sensor element;
      when configured into a second single-ended mode, apply the bias signal to a second sensor element of the recording head to generate a second single-ended output signal based on a response of the first sensor element; and
      when configured into a differential mode, concurrently apply the bias signal to the first sensor element and the second sensor element to generate a differential output signal based on a response of the first sensor element and the second sensor element,
   wherein the control circuitry further comprises:
      a first plurality of transistors configured into a first amplifier coupled to the first sensor element, wherein the first amplifier is configured to generate the first single-ended output when in the first single-ended mode; and
      a second plurality of transistors configured into a second amplifier coupled to the second sensor element, wherein the second amplifier is configured to generate the second single-ended output when in the second single-ended mode;
      wherein the second plurality of transistors comprises at least one transistor from the first plurality of transistors.

15. The device as recited in claim 14, wherein the control circuitry comprises:

a first lead connected to a first end of the first sensor element and connected to a first end of the second sensor element;

a second lead connected to a second end of the first sensor element; and a third lead connected to a second end of the second sensor element.

16. The device as recited in claim 15, wherein the control circuitry is further configured to concurrently apply the bias signal to the first and second sensor elements over the first lead.

17. The device as recited in claim 14, wherein at least one transistor from the first plurality of transistors and at least one transistor from the second plurality of transistors are configured into a third amplifier coupled to the first and second sensor elements, wherein the third amplifier is configured to generate the differential output when in the differential mode.

18. The device as recited in claim 14, wherein the control circuitry further comprises a bridge circuit configured to apply the bias signal concurrently to the first and second sensor elements when in the differential mode.

19. The device as recited in claim 14, wherein the bias signal is a voltage.

20. The device as recited in claim 14, wherein the bias signal is a current.

* * * * *